United States Patent
Spertus

(10) Patent No.: US 8,001,606 B1
(45) Date of Patent: Aug. 16, 2011

(54) MALWARE DETECTION USING A WHITE LIST

(75) Inventor: Michael Spertus, Chicago, IL (US)

(73) Assignee: Symantec Corporation, Mountain View, CA (US)

( * ) Notice: Subject to any disclaimer, the term of this patent is extended or adjusted under 35 U.S.C. 154(b) by 227 days.

(21) Appl. No.: 12/495,479

(22) Filed: Jun. 30, 2009

(51) Int. Cl.
*G06F 12/14* (2006.01)
(52) U.S. Cl. ............... 726/25; 709/203; 726/22; 726/23; 726/24
(58) Field of Classification Search .................. 709/203; 726/22–25
See application file for complete search history.

(56) References Cited

U.S. PATENT DOCUMENTS

| | | | |
|---|---|---|---|
| 7,571,482 B2 * | 8/2009 | Polyakov et al. ................ | 726/24 |
| 7,730,040 B2 * | 6/2010 | Reasor et al. ................. | 707/690 |
| 2007/0038677 A1 * | 2/2007 | Reasor et al. ................. | 707/200 |
| 2008/0147546 A1 * | 6/2008 | Weichselbaumer et al. .... | 705/41 |
| 2010/0077479 A1 * | 3/2010 | Viljoen ........................... | 726/23 |
| 2010/0083376 A1 * | 4/2010 | Pereira et al. .................. | 726/22 |

OTHER PUBLICATIONS

"TrustedSource™: the Next-Generation Reputation System White Paper," Secure Computing Corporation, Oct. 2006, 6 pages.
Walsh, L., "Careful, Trend Micro Might Give You a Bad Web Reputation," ChannelWeb Network, Mar. 26, 2007, 4 pages, [online] [Retrieved on Jun. 21, 2007] Retrieved from the Internet<URL:http://www.v3.crn.com/security/198500632>.

* cited by examiner

*Primary Examiner* — Mohamed Wasel
(74) *Attorney, Agent, or Firm* — Fenwick & West LLP

(57) ABSTRACT

A reputation server is coupled to multiple clients via a network. A security module at a client identifies an application and determines whether it is on a white list. If the application is not on the white list, the security module monitors the application using a strict set of signatures. If the application is on the white list, the security module monitors the application using a relaxed set of signatures. The relaxed set of signatures can exclude legitimate characteristics possessed by the application as specified by the white list. The security module evaluates whether the application is malicious based at least in part on whether it possesses suspicious characteristics described by the signatures. The reputation server receives reports from clients identifying applications and describing characteristics possessed by the applications and uses the reports to generate the white list.

16 Claims, 6 Drawing Sheets

MALWARE DETECTION USING A WHITE LIST

BACKGROUND OF THE INVENTION

1. Field of the Invention

This invention pertains in general to computer security and in particular to detection of malicious software.

2. Description of the Relayed Art

There is a wide variety of malicious software (malware) that can attack modern computers. Malware threats include computer viruses, worms, Trojan horse programs, spyware, adware, crimeware, and phishing websites. Malware can, for example, surreptitiously capture important information such as logins, passwords, bank account identifiers, and credit card numbers. Similarly, the malware can provide hidden interfaces that allow the attacker to access and control the compromised computer.

Modern malware is often targeted and delivered to only a relative handful of computers. For example, a Trojan horse program can be designed to target computers in a particular department of a particular enterprise. Such malware is difficult for security software to detect because there are fewer instances of the same malware, and the security software might not be configured to recognize it. Moreover, even mass-distributed malware is becoming harder to detect because the malware can contain polymorphisms designed to evade detection.

In response to the increasing difficulty of detecting malware, security software is evolving toward white list-based security. Under a white list approach, only software appearing on a white list of known legitimate software is allowed to execute on the computer. Software not appearing on the white list is treated as suspicious and might be prohibited from executing.

However, the white list approach has its own drawbacks. It is difficult, if not impossible, to maintain a comprehensive white list due to the large amount of legitimate software in the world today. When the security software encounters software that is not on the white list, it typically asks the user of the computer whether to execute the software. Querying the user can defeat the purpose of the security software since it simply transfers the security issue back to the user. In addition, malware can defeat white list-based security by subverting software appearing on the list. Therefore, there is a need in the art for a way to detect malware that does not suffer from these shortcomings.

BRIEF SUMMARY

The above and other needs are addressed by a method, computer-readable storage medium, and computer system for providing security. An embodiment of the method comprises determining whether an application identified at a client appears on a white list of legitimate applications. If the application does not appear on the white list, the application is monitored using a restrictive set of signatures. If the application does appear on the white list, the application is monitored using a relaxed set of signatures determined responsive to a behavioral reputation of the application. The method further comprises evaluating whether the application is malicious responsive to the monitoring.

An embodiment of the computer-readable storage medium stores executable computer program instructions comprising instructions for determining whether an application identified at a client appears on a white list of legitimate applications. The instructions further comprise instructions for monitoring the application using a restrictive set of signatures if the application does not appear on the white list and instructions for monitoring the application using a relaxed set of signatures determined responsive to a behavioral reputation of the application if the application does appear on the white list. The instructions further comprise instructions for evaluating whether the application is malicious responsive to the monitoring.

An embodiment of the computer system comprises a computer-readable storage medium storing executable computer program instructions. The computer program instructions comprise an interface module for receiving reports from clients, a report comprising an identifier of an application and a description of a characteristic possessed by the application at a client, and a behavioral reputation generation module for generating a behavioral reputation for the application responsive to the received reports, the behavioral reputation describing legitimate characteristics possessed at clients by the application. The computer program instructions further comprise a white list generation module for generating a white list responsive to the behavioral reputation, the behavioral white list describing legitimate characteristics of the application, and a distribution module for providing the white list to the clients. The computer system further comprises a processor for executing the computer program instructions.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
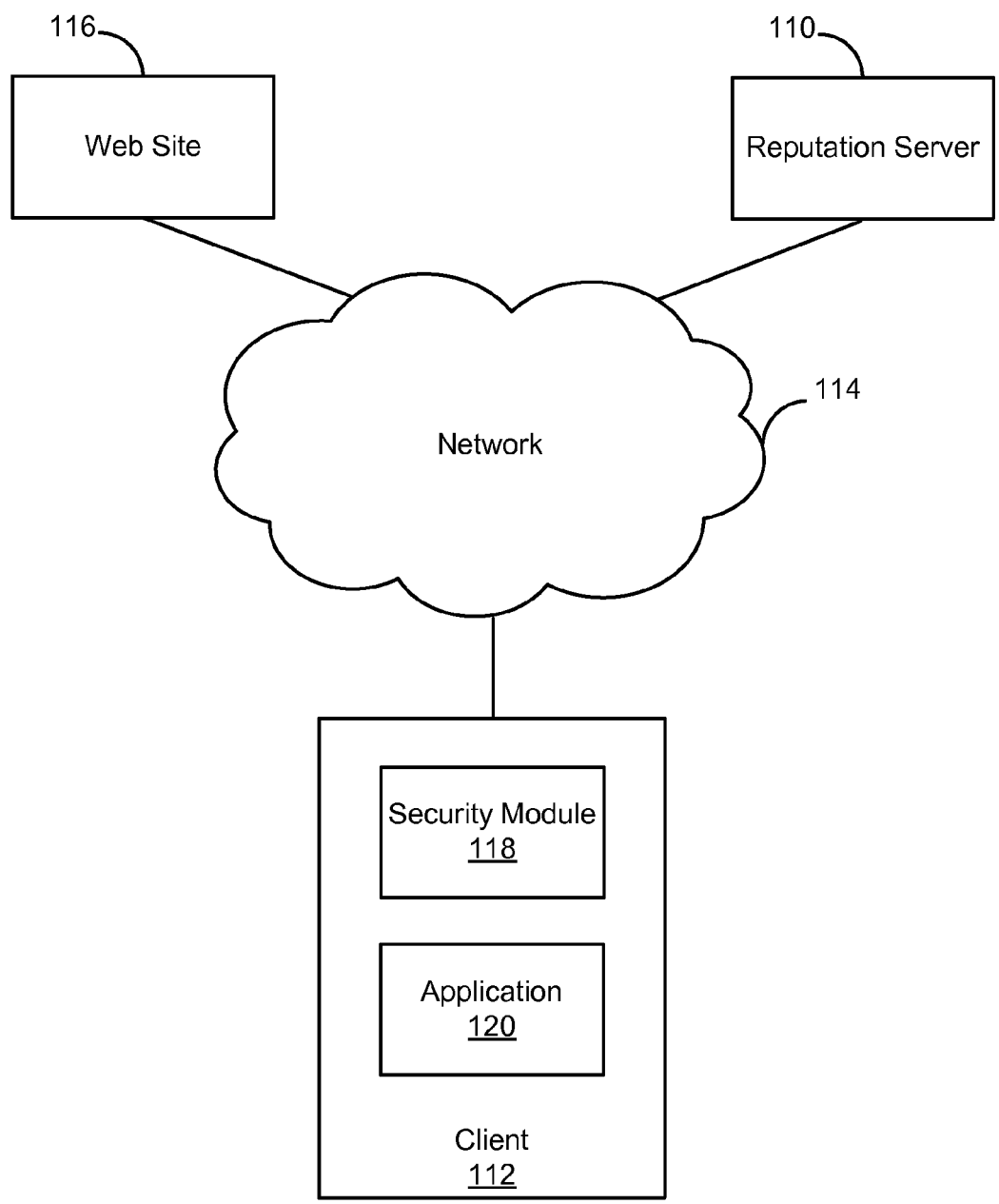
FIG. 1 is a high-level block diagram of a computing environment according to one embodiment.

FIG. 1 is a high-level block diagram of a computing environment 100 according to one embodiment. FIG. 1 illustrates a reputation server 110 and a client 112 connected by a network 114. FIG. 1 also shows a web site 116 connected to the network 114. Only one client 112 and one web site 116 are shown in FIG. 1 in order to simplify and clarify the description. Embodiments of the computing environment 100 can have thousands or millions of clients 112 and web sites 116 connected to the network 114, and there can be multiple reputation servers 110 as well.

In one embodiment, the client 112 is a computer used by one or more users to perform activities including browsing web sites 116 on the network 114 and downloading, installing, and/or executing applications. The client 112, for example, can be a personal computer executing a web browser such as MICROSOFT INTERNET EXPLORER that allows the user to retrieve and display content from web servers 116 and other computers on the network 114. In other embodiments, the client 112 is a network-capable device other than a computer, such as a personal digital assistant (PDA), a mobile telephone, a pager, a television "set-top box," etc. For purposes of this description, the term "client" also includes computers such as servers and gateways that encounter files or other entities that might constitute malware or other threats. For example, a client 112 can be a network gateway located between an enterprise network and the Internet.

The client 112 executes a security module 118 that provides security to the client 112 by detecting malware and performing other security-related tasks. In one embodiment, the security module 118 detects applications, such as application 120, that are resident on the client 112. Such applications 120 can be downloaded from a web site 116, for example. The security module 118 monitors the application and detects whether the application contains malware.

The security module 118 uses malware signatures to identify malware. The malware signatures can include string-based signatures that detect malware by identifying strings or other patterns within the malware. The malware signatures can also include behavioral signatures that detect malware by specifying suspicious behaviors that malware may perform. For example, the security module 118 can use a signature to detect if an application attempts to write to a memory space belonging to a second application, e.g. by using a string signature to detect a function in the application's import table or by observing the function call when the application executes, and use this detection as evidence that the application is malware. The security module 118 can convict the application as malware based on a single malware signature or based on a combination of signatures.

An embodiment of the security module 118 includes a white list of known legitimate applications. The white list can also specify known legitimate characteristics of the applications. The legitimate characteristics can include, for example, string signatures that are legitimately found in the applications and behaviors that the applications legitimately perform when executed. In one embodiment, if an application is not on the white list, the security module 118 monitors the execution of the application using a strict set of malware signatures. The strict set of signatures has a low rate of false negative detections (i.e., it will detect almost all malware) but may have a relatively high rate of false positive detections (i.e., it will occasionally identify a legitimate application as malware).

If the application is on the white list, the security module 118 uses a relaxed (less strict) set of malware signatures that produces fewer false positive detections. The relaxed set of signatures can exclude signatures for characteristics specified for that application by the white list. For example, if a given application is known to write to the memory space of another application, the white list can indicate that the application legitimately performs this behavior. The security module 118 can then use a relaxed set of signatures that excludes this behavior when monitoring the application. If the application possesses other suspicious characteristics not on the white list, these characteristics can be used as evidence that the application is malware. In addition, an embodiment of the security module 118 reports observed characteristics of applications to the reputation server 110 in order to support creating and modifying the white list.

The reputation server 110 provides reputations and white lists to the security modules 118 at the clients 112. In one embodiment, the reputation server 110 receives the reports of observed characteristics from the client security modules 118. The reputation server 110 uses these reports, and additional information such as the reputations of the applications and/or the hygienes of the clients 118, to generate behavioral reputations of the applications. An application's behavioral reputation describes the characteristics that the application commonly possesses on clients 112 with good hygiene, such as behaviors that the application performs. The reputation server 110 correlates the application's behavioral reputation with the malware signatures to identify the set of suspicious characteristics described by the signatures that the application legitimately performs and/or possesses. The reputation server 110 creates a white list identifying these characteristics and provides the white list to the security modules 118.

Using a white list in this manner thus supports malware detection while reducing false-positive malware detections. A set of strict malware signatures can be employed by the client security modules 118 against unknown applications not appearing on the white list to detect malware. These strict signatures will detect almost all malware at the expense of occasional false positive detections. A set of relaxed malware signatures based on the applications' behavioral reputations that produce fewer false positive detections can be employed against known applications appearing on the white list. If, however, malware hijacks a legitimate application and causes it to perform behaviors or gain other characteristics not on the white list, the security module 118 will detect these characteristics and can convict the application as malware. Moreover, the applications can be monitored to discover the legitimate behaviors and other characteristics of the applications and to build the white list. Thus, malware can be detected within unknown applications with a low rate of false negative detections, while malware can be detected within known applications with a low rate of false positive detections.

The network 114 represents the communication pathways between the reputation server 110 and clients 112. In one embodiment, the network 114 is the Internet and uses standard communications technologies and/or protocols. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
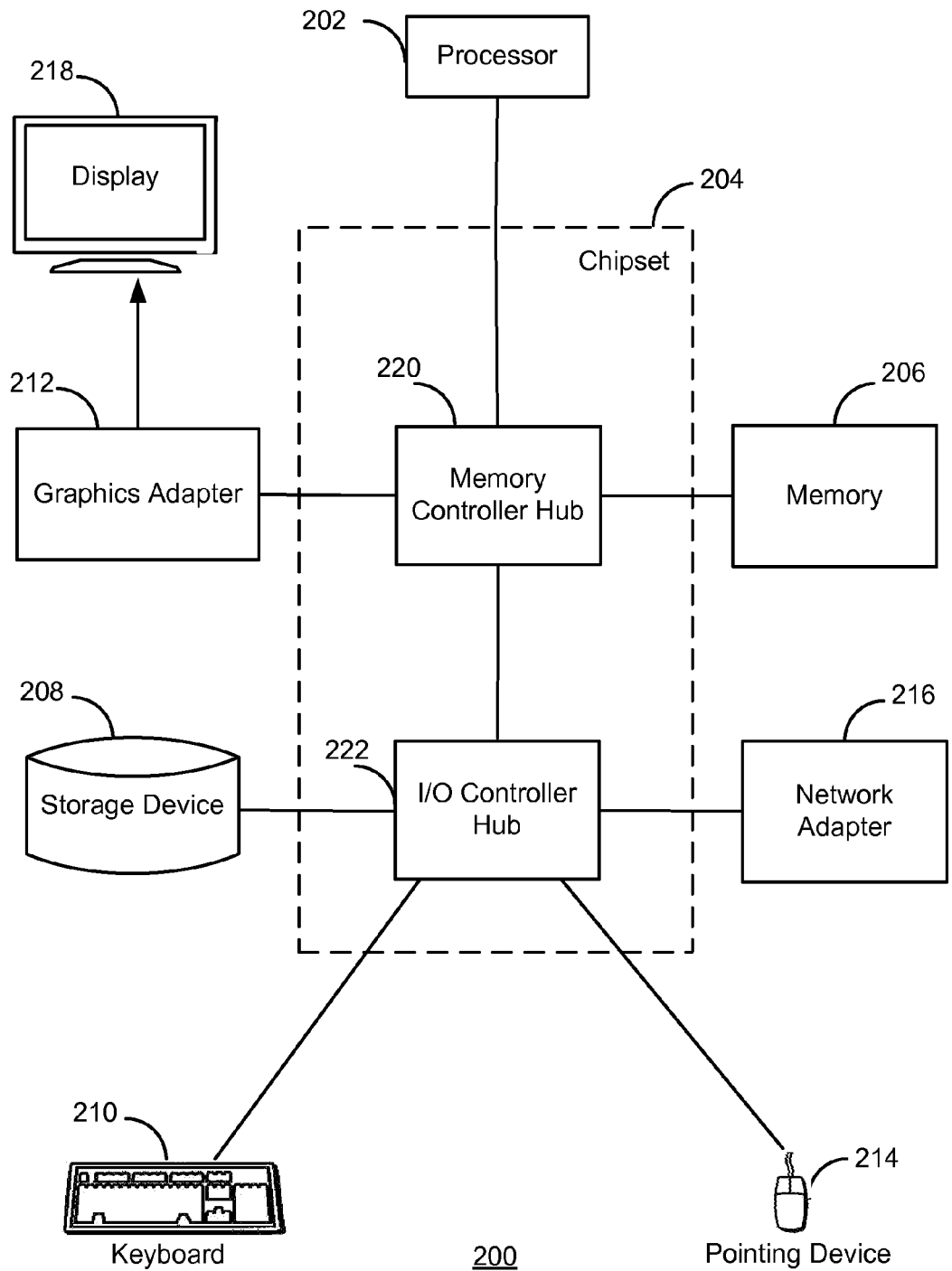
FIG. 2 is a high-level block diagram illustrating a typical computer for use as a reputation server or client.

FIG. 2 is a high-level block diagram illustrating a typical computer 200 for use as a reputation server 110 or client 112. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a reputation server 110 lacks a keyboard 210, pointing device 214, graphics adapter 212, and/or display 218. Moreover, the storage device 208 can be local and/or remote from the computer 200 (such as embodied within a storage area network (SAN)).

The computer 200 executes one or more operating systems such as a variant of MICROSOFT WINDOWS or LINUX. In general, the operating system executes one or more applications. The operating system and applications executed by the computer are formed of one or more processes. Thus, an application may be instantiated as a process executing under control of the operating system. In addition, an application can use functionality supplied by one or more dynamic link libraries (DLLs). The operating system can execute a DLL as a process when the functionality of the DLL is required by an application.

For purposes of clarity, this description uses the term "application" to refer to a file residing on the storage device 208 and an instance of the file being executed as a process by the operating system. "Application" can also refer to other entities used by a file residing on the storage device or an executing process. For example, a DLL called by an executing application can be treated as part of the application itself, or as a separate "application," depending upon the embodiment.

This description utilizes the term "module" to refer to computer program logic for providing a specified functionality. A module can be implemented in hardware, firmware, and/or software. A module is typically stored on the storage device 208, loaded into the memory 206, and executed by the processor 202. A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
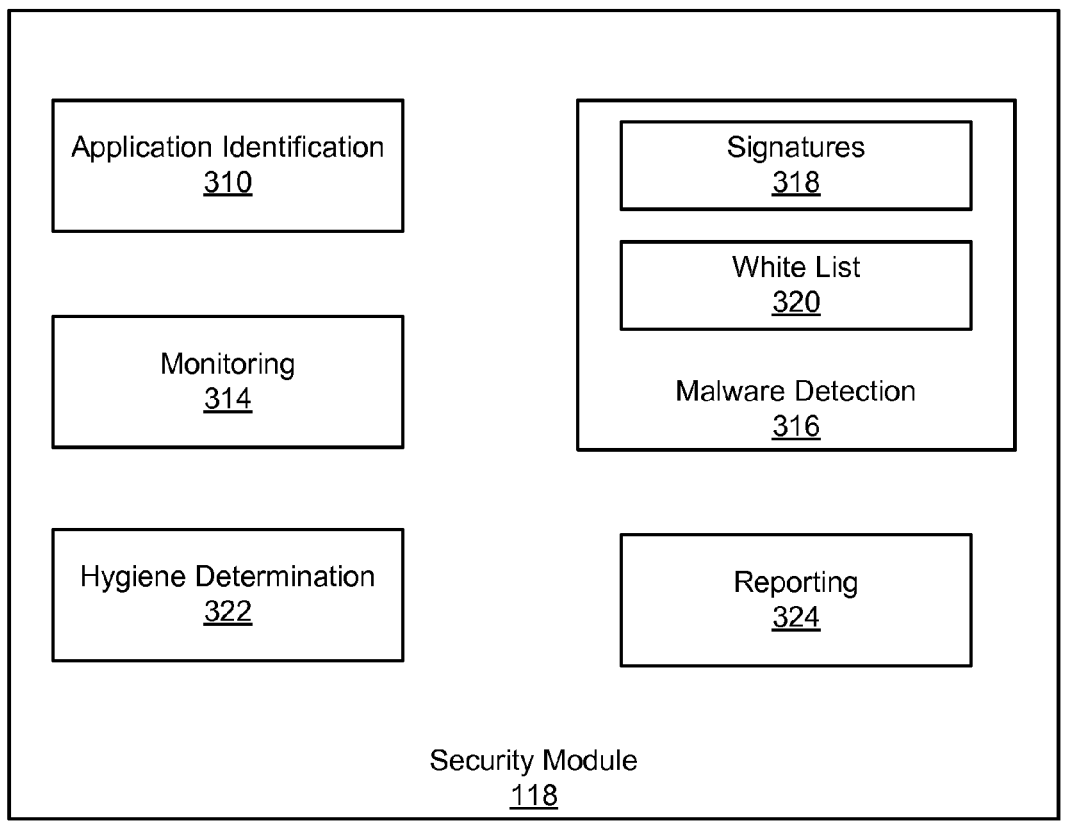
FIG. 3 is a high-level block diagram illustrating a detailed view of the security module of a client according to one embodiment.

FIG. 3 is a high-level block diagram illustrating a detailed view of the security module 118 of a client 112 according to one embodiment. In some embodiments the security module 118 is incorporated into an operating system executing on the client 112 while in other embodiments the security module is a standalone application or part of another product. As shown in FIG. 3, the security module 118 itself includes multiple modules.

An application identification (ID) module 310 identifies applications located at the client 112. In one embodiment, the application ID module 310 scans the storage device 208 and memory 206 associated with the client 112 to identify applications that are installed or stored on the storage device 208 and memory 206. This scan may occur at scheduled times or at other times, such as when an application is installed, stored, or executed on the client 112.

The application ID module 310 uses the characteristics detected during the scan to identify the application. For example, the application ID module 310 can generate an identifier that unambiguously identifies the application based on characteristics such as the name of a file on the storage device 208 constituting the application, the locations at which the file is stored, the size or content of the file, and/or hashes or other data derived from the file or corresponding process. An identified application can be said to be "known" or "unknown." A "known" application is one that has been encountered before and is recognized by the security module 118 and/or reputation server 110 as an instance of a given application. An "unknown" application, in contrast, is one that is not recognized and may represent an application that has not been previously encountered by the security module 118 and/or reputation server 110.

A monitoring module 314 monitors the characteristics of applications at the client 112. The types of characteristics for which the monitoring module 314 monitors depends upon the specific embodiment. In general, the monitoring module 314 monitors applications for characteristics that might indicate the presence of malware. These characteristics include suspicious behaviors and the presence of string signatures. The monitoring module 314 also collects data that can be used to produce behavioral reputations for applications by observing the behaviors that the applications perform and other characteristics.

In one embodiment, the monitoring module 314 executes certain applications, such as unknown applications not appearing on the white list, in a protected environment called a "sandbox." The monitoring module 314 prevents the applications executing in the sandbox from performing any potentially-malicious behaviors. For example, the monitoring module 314 can block or virtualize the behaviors. Using the sandbox in this manner allows applications to execute and be monitored while minimizing the risk of harm to the client 112. The monitoring module 314 can also monitor the execution of applications executing outside of the sandbox.

A malware detection module (the "detection module") 316 detects whether an application on the client 112 is malware. An embodiment of the detection module 316 includes a set of signatures 318 and a white list 320. In one embodiment, the signatures 318 and white list 320 are received from the reputation server 110. The detection module 316 uses the signatures 318, white list 320, and characteristics detected by the monitoring module 314 to evaluate suspicious characteristics of the applications and convict applications as malware when appropriate.

The signatures 318 describe characteristics that can indicate the presence of malware. The characteristics can include string signatures that identify suspicious characteristics that files having malware might contain and behavioral signatures describing suspicious behaviors that malware might perform. The string signatures, for example, can indicate that it is suspicious if a file contains text written in a certain language known to be associated with malware, if the file's import table indicates that the file uses a certain function known to be used by malware, or if the file contains a string known to be contained in a particular type of malware. The behavioral signatures can indicate that it is suspicious if an executing application performs behaviors such as using the WriteProcessMemory function to write to the address space of another application (i.e., to another process), accessing certain files on the storage device 208, such as operating system registry files, and communicating with remote servers on the network 114.

In one embodiment, the signatures 318 are arranged into multiple sets. A "strict" set of signatures, as mentioned above, has a low rate of false negative detections but may have a relatively high rate of false positive detections. A "relaxed" set of signatures, in contrast, may have a higher rate of false negative detections but a lower rate of false positive detections. In one embodiment, the relaxed set of signatures is a subset of the strict set of signatures. The specific signatures appearing in each set depends upon the embodiment. The relaxed signature set can include an empty set.

The white list 320 identifies known applications and can describe the behavioral reputations of the applications (i.e., legitimate characteristics possessed or performed by the application). The white list 320 can identify an application using the same identifier generated by the application ID module 310, thus allowing the detection module 316 to correlate an application referenced in the white list with an application identified on the client 112. The white list 320 can specify the behavioral reputations of the applications within the list itself and/or contain a reference to one or more other locations where the behavior reputations are stored, including locations on the network 114. The behavioral reputations, in turn, are correlated with the signatures 318. In other words, the white list 320 identifies signatures 318 that the associated application is known to possess (i.e., string signatures the application is known to contain and/or behavioral signatures the application is known to perform).

The detection module 316 uses the signatures 318 and interacts with the monitoring module 314 to detect whether an application at the client is malware. For a given application, an embodiment of the detection module 316 determines whether the application is on the white list 320. If the application is not listed on the white list 320, the detection module 316 applies the strict signature set to the application. If the application is listed on the white list, the detection module 316 applies the relaxed signature set to the application.

If the white list 320 lists includes (specifies) a behavioral reputation for the application, the detection module 316 removes the signatures found in the behavioral reputation from the relaxed signature set. This removal effectively ignores an application's suspicious characteristic (e.g., behavior) if that characteristic appears in the white list 320. In other words, the suspicious characteristic is not used as evidence that the application is malware. However, the application can still be convicted as malware based on characteristics not appearing in the white list 320.

The detection module 316 uses the applied signature set (strict or relaxed) to determine whether the application has characteristics indicative of malware. To this end, the detection module 316 uses the monitoring module 314 to scan the application for any of the string signatures contained within the signatures 318. If the string signatures definitely indicate that the application is malware, the detection module 316 convicts the application.

Assuming the application is not convicted based on the string signatures alone, the detection module 316 allows the application to execute and monitors the execution using the monitoring module 314. The detection module 316 detects if the application performs a suspicious behavior specified by the applied signature set. If an application performs a suspicious behavior, then this behavior is evidence that the application is (or contains) malware. The detection module 316 evaluates the evidence for an application and determines whether to convict the application as malware. Depending upon the embodiment, the detection module 316 can convict an application as malware based on the detection of a single suspicious characteristic, based on the detection of multiple suspicious characteristics, and/or based on the detection of one or more suspicious characteristics in combination with other evidence, such as a poor reputation for the application.

A hygiene determination module 322 (the "hygiene module") interacts with the detection module 316 to determine a hygiene score for the client 112. The hygiene score represent an assessment of the trustworthiness of the client 112. "Trustworthiness" in this context refers to the client's propensity for getting infected by malware, where a client 112 more frequently infected with malware is less trustworthy. "Trustworthiness" also corresponds to the ability of the user of the client 112 to avoid the malware. Certain types of users are substantially more likely to engage in risky online behaviors than other users. For example, teenagers and other young people are more likely to download files from peer-to-peer networks and other places where malware is often found. These activities lead to increased malware detections and, as a result, clients 112 used by such users often receive poor hygiene scores. Other users do not engage in risky behaviors and encounter malware infrequently. Clients 112 of these latter users receive good hygiene scores. The hygiene scores can also be based on other criteria, such as the frequency that the user browses known malicious or unsavory websites.

A reporting module 324 interfaces the client 112 with the reputation server 110 via the network 114 and allows the security module 118 and reputation server 110 to exchange information. The information exchanges can occur in batch at specified times, such as once a day. The information exchanges can also occur continuously. For example, incremental information exchanges can occur as events are detected on the client 112 or new information is provided by the reputation server 110.

The reporting module 324 provides the reputation server 110 with information that can be used to develop application reputations, behavioral reputations, and the white list 320. In one embodiment, the reporting module 324 provides the identifiers of applications identified at the client 112 to the reputation server 110. In addition, the reporting module 324 provides the hygiene of the client 112 to the reputation server 110. This information allows the reputation server 110 to determine the hygiene levels of clients on which applications are predominately found (e.g., to determine that an application is predominantly found on clients with poor hygiene). The reporting module 324 also provides the reputation server 110 with information describing the characteristics possessed by the identified applications. This information can include a description of suspicious strings found in an application and suspicious behaviors that an application was observed to perform.

An embodiment of the reporting module 324 also reports information about the security module 118 to a user of the client 112. For example, the reporting module 324 can provide an alert, dialog box, or other user interface notification to a user of the client 112 if it detects malware or a similar event occurs, such as an application performing a suspicious behavior. The reporting module 324 can provide the user with a menu of possible actions to perform in response to a malware detection, such as quarantining the application, repairing the application, blocking a suspicious behavior, or ignoring the report. The reporting module 324 can perform additional actions such as maintaining a log of identified applications, monitored behaviors, and malware detections.

Figure 4:
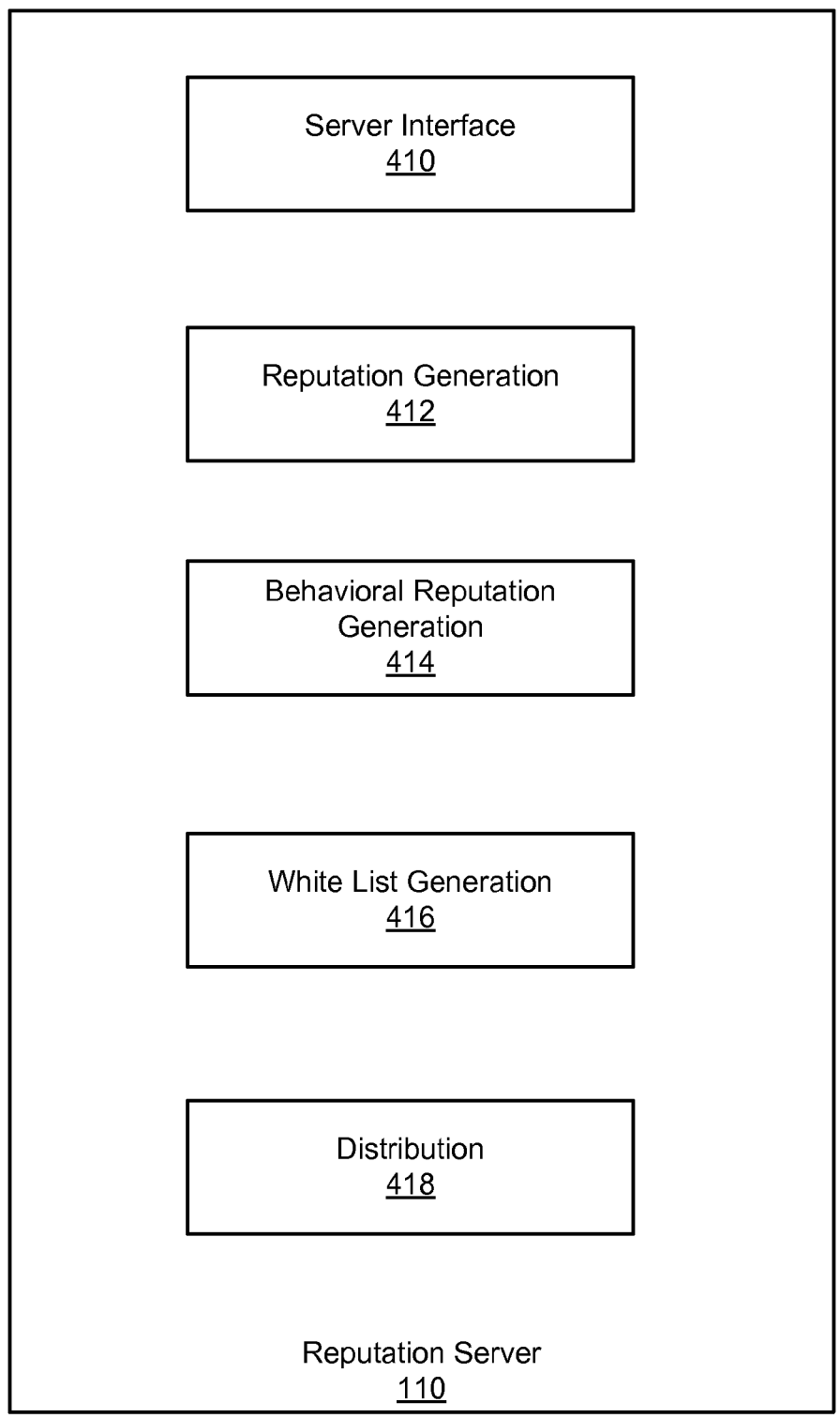
FIG. 4 is a high-level block diagram illustrating a detailed view of the reputation server according to one embodiment.

FIG. 4 is a high-level block diagram illustrating a detailed view of the reputation server 110 according to one embodiment. In some embodiments the reputation server 110 is incorporated into another server. The reputation server 110 can be provided, for example, by the developer of the security module 118. As shown in FIG. 4, the reputation server 110 includes multiple modules.

A server interface module 410 receives information from security modules 118 of clients 112 via the network 114. As discussed above, this information can include identifiers of applications, hygiene scores of clients 112, and monitored characteristics of the applications. The server interface module 410 can also receive other information from the clients 112, depending upon the embodiment.

A reputation generation module 412 generates application reputation scores for applications identified by the clients 112. In one embodiment, the reputation score is a numeric value based on the hygiene scores of the clients 112 at which the application is found. For example, an application that is frequently found on clients 112 having high hygiene scores is likely to receive a high reputation score indicating a good reputation. In contrast, an application that is primarily found on clients 112 having low hygiene scores is likely to receive a low reputation score indicating a poor reputation. Application reputation scores can also be based on other factors, such as reputation scores of websites on which applications are found, reputation scores of developers and/or distributors of the applications, weights assigned to certain clients 112, and other characteristics such as whether the applications are digitally signed.

The application reputation score assigned to an application can evolve over time. One embodiment initially assigns a previously-unknown application a low reputation score. This initial low score represents a "probation period" where the application is treated as potentially-malicious until it is encountered by enough clients 112 to assess its true reputation. Thus, the initial reputation score is likely to change as the application is encountered by an increasing number of clients 112. An application with an initially-low reputation score can receive a higher reputation score as it is installed and executed by clients having good hygiene. An embodiment of the reputation generation module 412 observes these sorts of activities and continually updates applications' reputation scores.

A behavioral reputation generation module 414 generates behavioral reputations for applications identified at the clients 112. As mentioned above, an application's behavioral reputation describes the characteristics that the application commonly possesses on clients 112 with good hygiene. Therefore, this module 414 generates the behavioral reputation for an application by identifying those clients 112 with good hygiene on which the application is found, and determining the set of common characteristics reported by those clients. Since these characteristics are common to a cross-section of clients having good hygiene, the characteristics can be considered legitimate.

The behavioral reputations of applications can evolve over time. An application resident at the clients 112 can be patched or upgraded by its developer to possess new characteristics, such as performing new behaviors. These new characteristics are detected by the clients 112 and reported to the reputation server 110. The behavioral reputation generation module 414 recognizes such new characteristics and updates the behavioral reputation when appropriate. This updating can occur, for example, in response to the reputation server 110 receiving reports from many clients with good reputations that an application performed a suspicious behavior.

A white list generation module 416 generates the white list 320. In one embodiment the white list generation module 416 generates a white list for only a subset of applications found at clients 112, such as applications having good reputations and/or found at a threshold number of clients. Depending upon the embodiment, the white list generation module 416 creates a common white list for all applications or creates a separate white list for each application.

To generate the white list, the white list generation module 416 determines the behavioral reputation for an application. The white list generation module 416 compares the characteristics within the behavioral reputation with the suspicious characteristics defined by the signatures to identify the set of characteristics in the behavioral reputation that would normally be considered suspicious. This set of characteristics is included on the white list. For example, if the behavioral reputation for a given application includes using the WriteProcessMemory function to write to the memory space of another application, the white list generation module 416 can include the WriteProcessMemory signature on the white list. The white list can evolve as the application's behavioral reputation evolves.

A distribution module 418 distributes data to the clients 112. The distributed data include the behavioral white list. The distribution module 418 can also provide other data, such as signatures, software updates, and the like. The data can be distributed at the request of the client security modules 118 and/or pushed by the distribution module 418.

Figure 5:
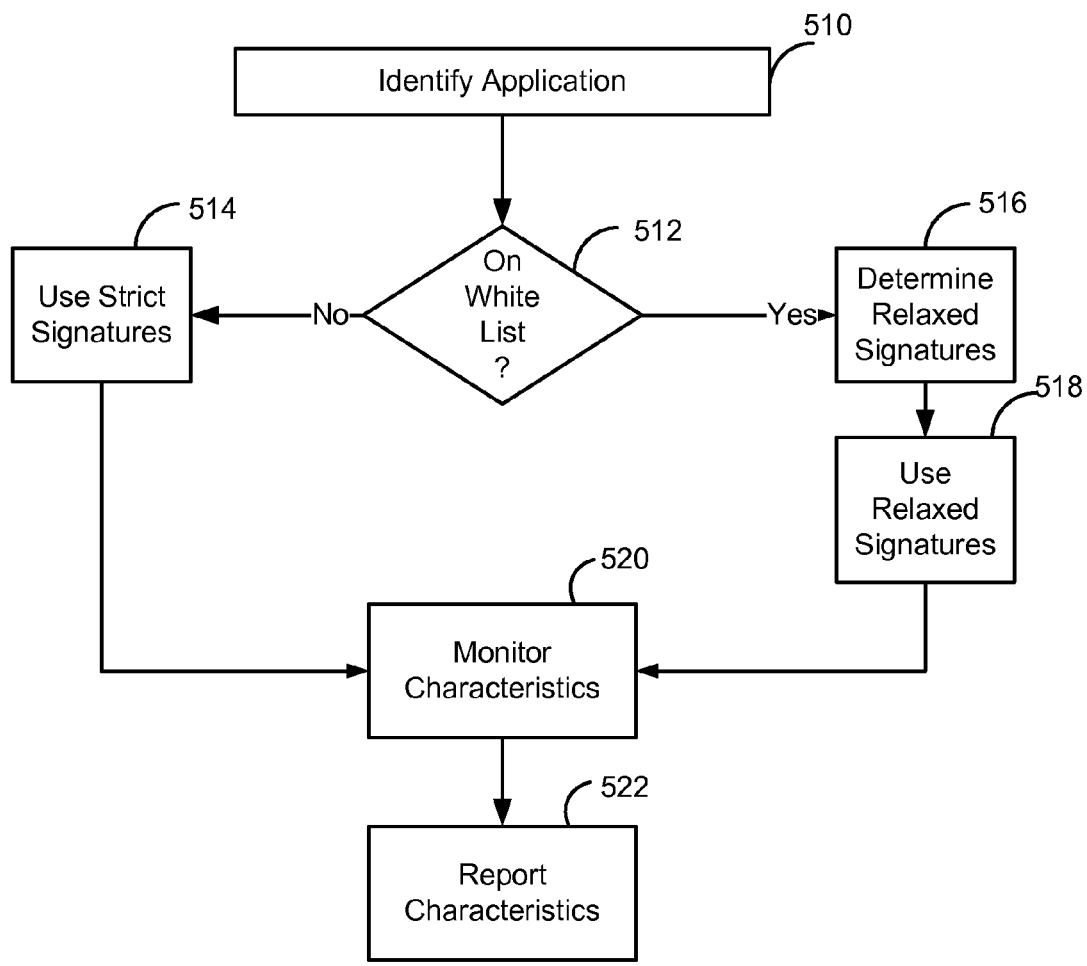
FIG. 5 is a flowchart illustrating steps performed by the security module to provide security to the client according to one embodiment.

FIG. 5 is a flowchart illustrating steps performed by the security module 118 to provide security to the client 112 according to one embodiment. Other embodiments perform the illustrated steps in different orders, and/or perform different or additional steps. Moreover, some or all of the steps can be performed by modules other than the security module 118.

The security module 118 identifies 510 an application at the client 112. The security module 118 uses the identity to determine 512 whether the application is listed on the white list 320. If 512 the application is not listed on the white list, the security module 118 uses 514 a strict set of signatures to monitor 520 the application. The security module 118 can also cause the application to execute in a restrictive sandbox environment.

If 512 the application is listed on the white list 320, the security module 118 determines 516 a relaxed set of behavioral signatures for the application. The relaxed set of signatures can be, for example, a subset of the strict set of signatures. In addition, the relaxed set of signatures can exclude any signatures for the legitimate characteristics described by the application's behavioral reputation in the white list. Alternatively, the relaxed set of behavioral signatures can be formed by excluding the signatures described by the behavioral reputation from the strict set of signatures. The security module 118 uses 518 the relaxed set of signatures to monitor 520 the application.

The security module 118 monitors 520 the application to detect whether the application possesses any suspicious string signatures or performs any suspicious behaviors when executed (e.g., the application attempts to perform a function that is proscribed by a signature). A suspicious characteristic is evidence that the application is malicious and can result in convicting the application as malware.

The security module 118 reports 522 the characteristics. The reporting 522 can include providing the user of the client 112 with an alert, dialog box, or other notification indicating that the security module 118 encountered a suspicious characteristic and/or determined that the application is malware. The reporting can also include performing additional actions, such as blocking the application from performing a suspicious behavior.

The security module 118 further reports 522 monitored characteristics to the reputation server 110. This reporting 522 can occur asynchronously with the other actions described with respect to FIG. 5. For example, reporting characteristics to the reputation server 110 can occur at a scheduled time and/or upon the occurrence of an event. The report to the reputation server 110 provides an identifier of the application, the hygiene of the client 112, and/or information describing the monitored characteristics.

Figure 6:
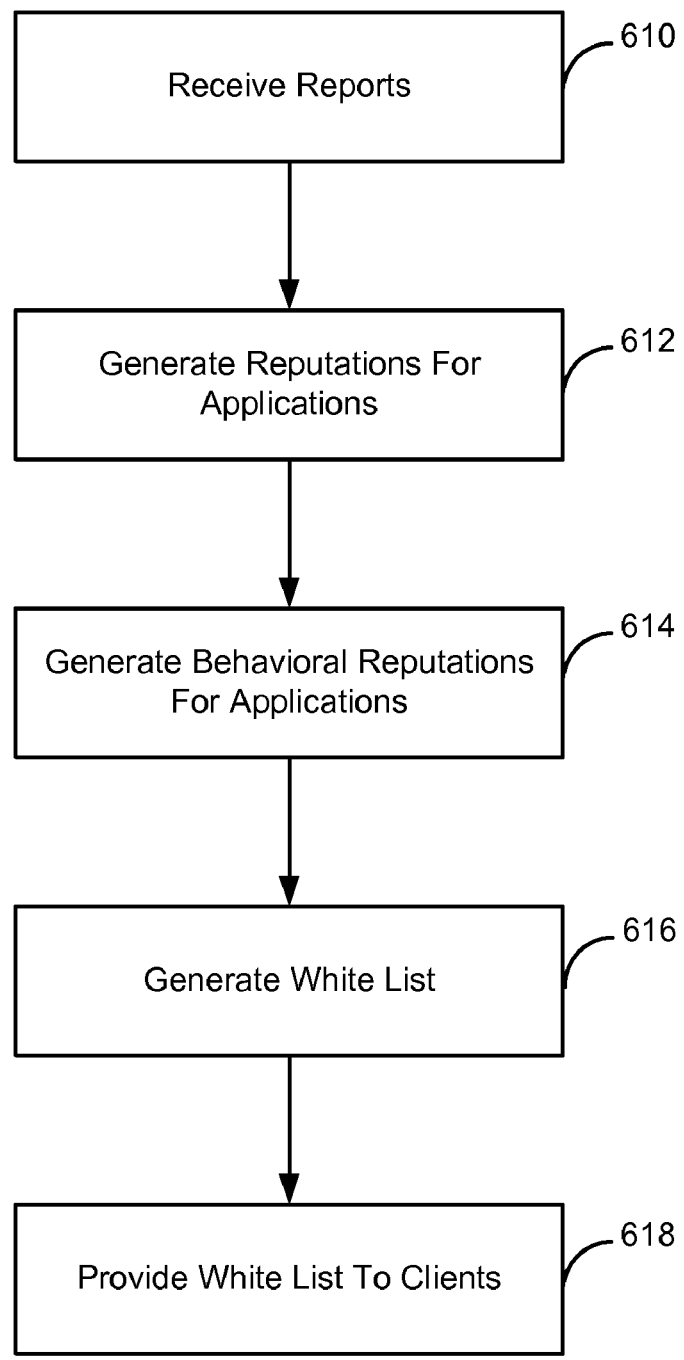
FIG. 6 is a flowchart illustrating steps performed by the reputation server according to one embodiment.

FIG. 6 is a flowchart illustrating steps performed by the reputation server 110 according to one embodiment. Those of skill in the art will recognize that embodiments of the reputation server 110 simultaneously communicate with multiple clients 112. Therefore, embodiments of the reputation server 110 may perform multiple instances of the steps of FIG. 6 simultaneously. Other embodiments perform the illustrated steps in different orders, and/or perform different or additional steps. Moreover, some or all of the steps can be performed by entities other than the reputation server 110.

The reputation server 110 receives 610 reports from the clients 112. As described above, the reports include information such as identifiers of applications detected at the clients 112, hygiene scores of clients, and descriptions of characteristics possessed by the applications. The reputation server 110 generates 612 reputation scores for the applications encountered by the clients 112. The application reputation scores are based at least in part on the hygienes of the clients 112. The server 110 may generate a high reputation score for an application that is frequently encountered by clients 112 having good hygiene. In the same vein, the server 110 may generate a low reputation score for a file most frequently encountered on clients 112 having poor hygiene.

The reputation server 110 also generates 614 behavioral reputations for applications. The behavioral reputations describe the common characteristics of applications on clients having good hygiene. The reputation server 110 adds 616 certain applications to the white list 320, such as applications having good reputations, and includes the behavioral reputations for the applications on the white list. The reputation server 110 provides 618 the white list to the clients 112.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of providing security using a computer, comprising:
   determining whether an application identified at a client appears on a white list of legitimate applications;
   responsive to a determination that the application does not appear on the white list, monitoring execution of the application using a restrictive set of signatures;
   responsive to a determination that the application does appear on the white list:
      identifying a behavioral reputation of the application describing legitimate characteristics the application possesses;
      excluding the legitimate characteristics described by the behavioral reputation from a set of signatures to produce a relaxed set of signatures; and
      monitoring execution of the application using the relaxed set of signatures; and
   evaluating whether the application is malicious responsive to the monitoring.

2. The method of claim 1, wherein the behavioral reputation of the application is specified by the white list.

3. The method of claim 1, wherein evaluating whether the application is malicious comprises:
   identifying characteristics possessed by the application;
   designating as suspicious any of the identified characteristics that appear in the set of signatures used in monitoring the application; and
   evaluating whether the application is malicious responsive to any characteristics designated as suspicious.

4. The method of claim 1, wherein evaluating whether the application is malicious comprises:
   identifying behaviors performed by the application during execution;
   designating as suspicious any of the identified behaviors that appear in the set of signatures used in monitoring the execution of the application; and
   evaluating whether the application is malicious responsive to any behaviors designated as suspicious.

5. The method of claim 1, wherein the relaxed signatures are a subset of the restrictive signatures.

6. The method of claim 1, further comprising:
   determining a hygiene score for the client, the hygiene score representing an assessment of the trustworthiness of the client; and
   reporting monitored characteristics of the application and the hygiene score to a server connected to the client via a network;
   wherein the server is adapted to create the white list responsive to the hygiene score and the monitored characteristics and to provide the white list to the client.

7. A non-transitory computer-readable storage medium storing executable computer program instructions for providing security to a computer, the instructions comprising instructions for:
   determining whether an application identified at a client appears on a white list of legitimate applications;
   responsive to a determination that the application does not appear on the white list, monitoring execution of the application using a restrictive set of signatures;
   responsive to a determination that the application does appear on the white list:
      identifying a behavioral reputation of the application describing legitimate characteristics the application possesses;
      excluding the legitimate characteristics described by the behavioral reputation from a set of signatures to produce a relaxed set of signatures; and
      monitoring execution of the application using the relaxed set of signatures; and
   evaluating whether the application is malicious responsive to the monitoring.

8. The non-transitory computer-readable storage medium of claim 7, wherein the behavioral reputation for the application is specified by the white list.

9. The non-transitory computer-readable storage medium of claim 7, wherein evaluating whether the application is malicious comprises:
   identifying characteristics possessed by the application;
   designating as suspicious any of the identified characteristics that appear in the set of signatures used in monitoring the application; and
   evaluating whether the application is malicious responsive to any characteristics designated as suspicious.

10. The non-transitory computer-readable storage medium of claim 7, wherein evaluating whether the application is malicious comprises:

identifying behaviors performed by the application during execution;

designating as suspicious any of the identified behaviors that appear in the set of signatures used in monitoring the execution of the application; and evaluating whether the application is malicious responsive to any behaviors designated as suspicious.

11. The non-transitory computer-readable storage medium of claim 7, wherein the relaxed signatures are a subset of the restrictive signatures.

12. The non-transitory computer-readable storage medium of claim 7, further comprising instructions for:

determining a hygiene score for the client, the hygiene score representing an assessment of the trustworthiness of the client; and reporting monitored characteristics of the application and the hygiene score to a server connected to the client via a network;

wherein the server is adapted to create the white list responsive to the hygiene score and the monitored characteristics and to provide the white list to the client.

13. A computer system for providing security, comprising:

a non-transitory computer-readable storage medium storing executable computer program instructions comprising:

an interface module for receiving reports from clients, the reports comprising identifiers of applications and descriptions of execution characteristics possessed by the applications at the clients;

a behavioral reputation generation module for generating behavioral reputations for the applications responsive to the received reports, the behavioral reputations describing legitimate execution characteristics possessed at clients by the applications;

a white list generation module for generating a white list responsive to the behavioral reputations, the white list describing legitimate execution characteristics of the applications; and a distribution module for providing the white list to the clients, wherein a client is adapted to:

determine whether an application identified at the client appears on the white list;

responsive to a determination that the application does not appear on the white list, monitor execution of the application using a restrictive set of signatures;

responsive to a determination that the application does appear on the white list:

identify a behavioral reputation of the application describing legitimate execution characteristics of the application;

exclude the legitimate execution characteristics described by the behavioral reputation from a set of signatures to produce a relaxed set of signatures;

monitor execution of the application using the relaxed set of signatures; and evaluate whether the application is malicious responsive to the monitoring; and a processor for executing the computer program instructions.

14. The computer system of claim 13, wherein the reports comprise descriptions of behaviors performed by the applications at the clients and the characteristics described by the behavioral reputations comprise legitimate behaviors performed by the applications at clients.

15. The computer system of claim 13, wherein the reports further comprise hygiene scores describing hygienes of the clients and wherein the behavioral reputation generation module is further adapted to:

identify reports from clients having good hygiene, wherein the behavioral reputations for the applications are generated responsive to the reports received from clients having good hygiene and the behavioral reputations describe characteristics possessed by the applications at clients having good hygiene.

16. The computer system of claim 13, wherein the reports further comprise hygiene scores describing hygienes of the clients and further comprising:

a reputation generation module for generating application reputations for the applications responsive to the hygiene scores of clients from which reports are received, the application reputations describing trustworthiness of the applications;

wherein the white list generation module generates the white list responsive to the reputations for the applications.

* * * * *